United States Patent [19]
Yamanaka et al.

[11] Patent Number: 5,610,952
[45] Date of Patent: Mar. 11, 1997

[54] SYNCHRONIZATION SIGNAL GENERATING DEVICE

[75] Inventors: Ken Yamanaka; Hiroaki Ugawa, both of Hyogo, Japan

[73] Assignee: Hewlett-Packard Company, Palo Alto, Calif.

[21] Appl. No.: 559,915

[22] Filed: Nov. 17, 1995

[30] Foreign Application Priority Data

Nov. 25, 1994 [JP] Japan .................................. 6-315568

[51] Int. Cl.$^6$ .............................. H04L 7/00; H04L 25/36
[52] U.S. Cl. .......................... 375/371; 375/375; 375/376; 327/7; 327/156; 327/159; 331/25
[58] Field of Search ..................................... 375/371, 373, 375/375, 376; 327/2, 3, 7, 10, 12, 141, 146, 147, 155, 156, 158–159; 331/1 A, 1 R, 11, 14, 12, 25, 27

[56] References Cited

PUBLICATIONS

Motorola Mecl Data—DL122/D Rev 5—1993—(pp. 103–106)—Motorola Inc.—Motorola Mecl Integrated Circuits'.

*Primary Examiner*—Stephen Chin
*Assistant Examiner*—Don Vo

[57] ABSTRACT

A synchronization signal generation device includes a circuit that enables a phase difference between a synchronization signal and an input signal with intermittent edges to be arbitrarily and continuously varied. The synchronization signal generating device is of the second order phase locked loop and has a phase detector with the following elements: a circuit for generating pulses with widths corresponding to the phase difference between the input signal and the synchronization signal only upon occurrence of an edge of the input signal; a circuit for generating pulses with a constant width only upon occurrence of an edge of the input signal or the synchronization signal; a variation circuits which varies one or both of the amplitudes of the aforesaid pulses; and a combining circuit which adds or subtracts the pulses from the variation circuits to derive a phase comparison signal.

6 Claims, 10 Drawing Sheets

SYNCHRONIZATION SIGNAL GENERATING DEVICE

FIELD OF THE INVENTION

This invention relates to a device which generates a synchronization signal from digital input signals and, more particularly, it concerns a synchronization signal generating device which generates a synchronization signal of any arbitrary phase from signals, the edges of which occur intermittently, such as digital data signals.

BACKGROUND OF THE INVENTION

In the process of reading digital data from a digital recording device, the bit error rate changes with the phase relationship of the digital data signal and the synchronization signal. Therefore, in digital recording devices, it is necessary to measure the changes in bit error rate with changes in the phase of the synchronization signal and to investigate the allowable range of phase difference and jitter of the synchronization signal.

This invention is used especially in the measurement of bit errors of digital signals which are read from digital recording devices, etc. Moreover, by means of this invention, which can vary the phase of the synchronization signal arbitrarily, it is possible to optimize the phase of a synchronization signal so that bit errors which occur during read-out of a digital recording device are minimized.

Figure 6A:
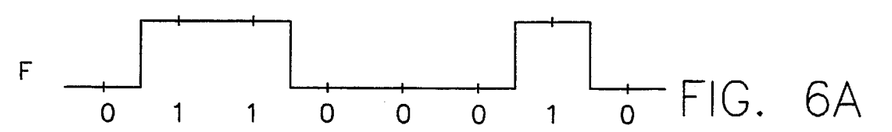
(FIGS. 6a–6e): Diagram showing examples of signals produced when read-out signals from a digital recording device are correctly sampled by a synchronization signal with no phase difference.
Figure 6B:
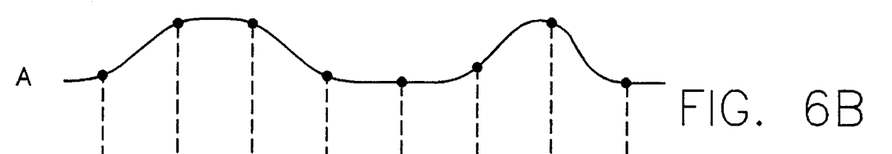
Figure 6C:
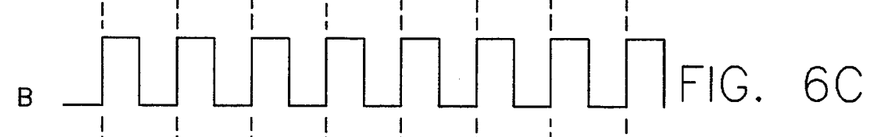
Figure 6D:
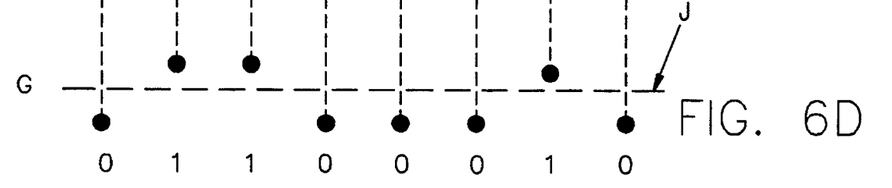
Figure 6E:
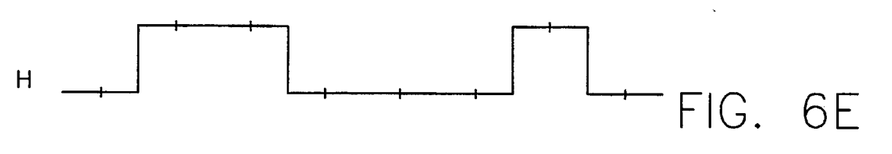
Figure 7A:
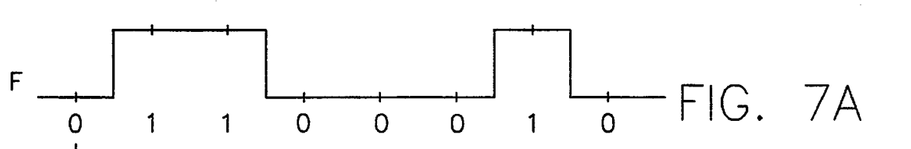
(FIGS. 7a–7e): Diagram showing examples of signals produced when read-out signals from a digital recording device are wrongly sampled by a synchronization signal with a phase difference.
Figure 7B:
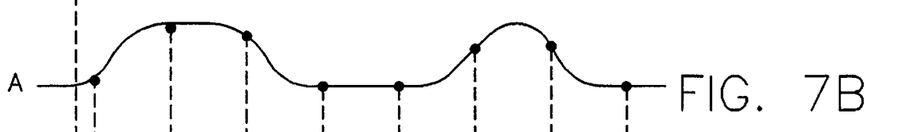
Figure 7C:
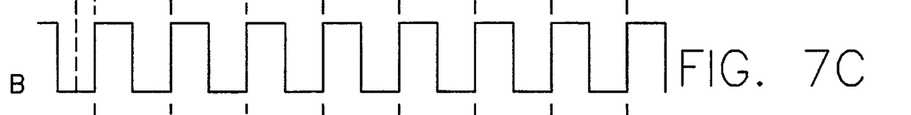
Figure 7D:
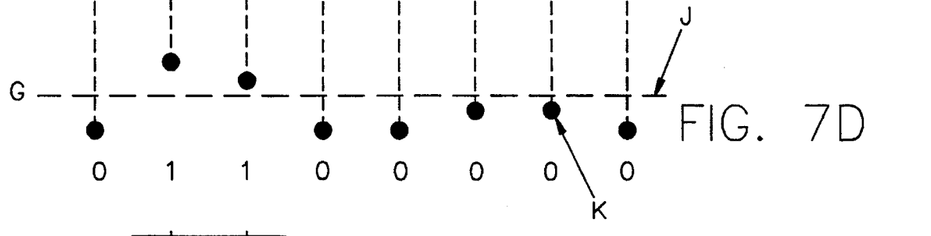
Figure 7E:
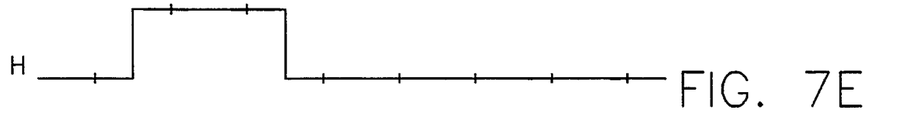

Hereafter, an example will be discussed of a change in the bit error rate due to changes in the phase of the synchronization signal, by using FIGS. 6a–6e and 7a–7e. The signal F is the original digital signal comprising information which has been recorded by a recording device; the signal read out by the digital recording device is ordinarily in a distorted waveform, as shown by waveform A (FIG. 6b). B is the synchronization signal (FIG. 6c). The small vertical lines shown in signal waveform F are not signals, but signs which show the synchronization positions. Moreover, the dots shown in Signal A are signs which show the sampling positions, as discussed below.

In FIGS. 6a–6e, there is no phase difference between original digital signal F, i.e., read-out signal A, and synchronization signal B. Therefore, if signal A is sampled at the rising edge of synchronization signal B, the correct value of signal A is sampled and a discrete signal G is obtained (the dots in FIG. 6d). This signal G is converted to binary digits by a threshold value J, shown by the horizontal dotted line in FIG. 6d, and digital signal H (FIG. 6e) is obtained. Signal H includes no errors and is similar to original digital signal F.

However, if as shown in FIGS. 7a–7e, there is a large phase difference between read-out signal A and synchronization signal B, the timing of the sampling during data reproduction is displaced from the original timing, and correct values are not sampled. As a result, when sampled signal G is converted to binary digits by threshold value J, sample K gives rise to a bit error and reproduced signal H contains an error. In FIGS. 7a–7e, even if no errors arise, the margin between the samples with values near the threshold and noise, in an actual circuit, are small, and the probability of bit errors arising is high.

As discussed above, the bit error rate changes with the displacement of the sample timing, due to the phase difference of the synchronization signal. In order to measure the changes in the bit error rate with respect to changes in the phase of the synchronization signal, it must be possible to generate a synchronization signal from the input digital signal and to set the phase of the synchronization signal arbitrarily.

Figure 8:
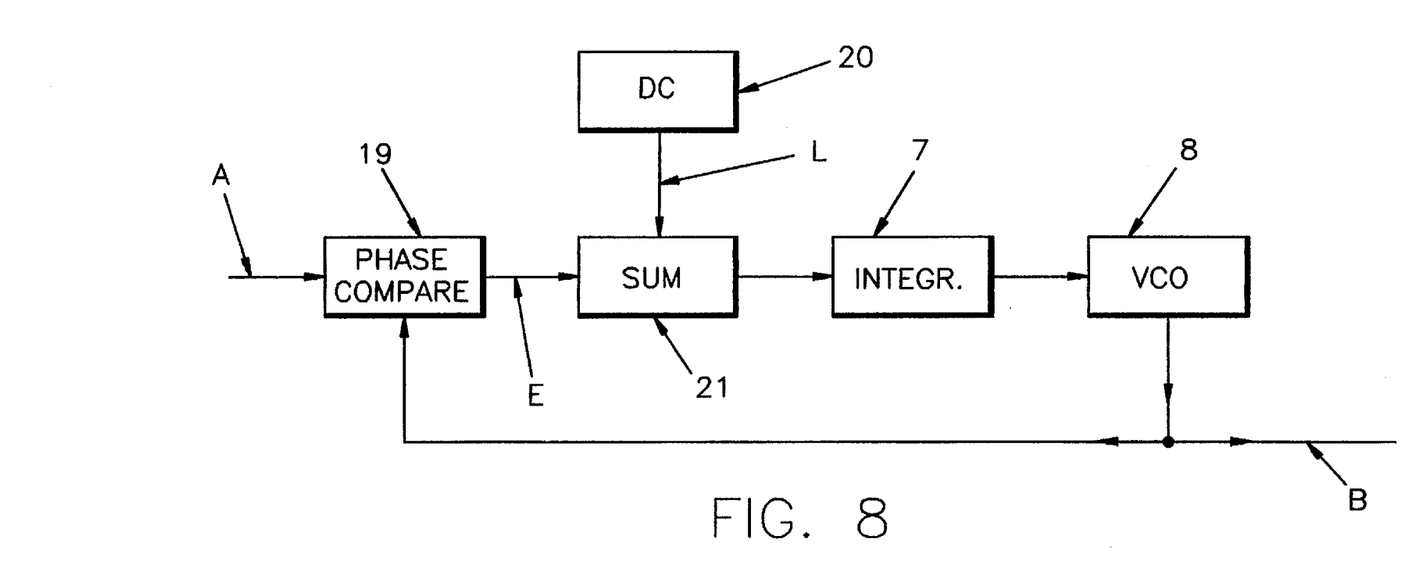
(FIG. 8): Diagram of principle of phase locked loop with phase-controlling function of conventional technology.

In generating a synchronization signal from an input signal, a second order phase locked loop is generally used, such as shown in FIG. 8. In the phase locked loop, the output of a voltage-controlled oscillator 8 is synchronization signal B. Input signal A and synchronization signal B are compared by a phase detector 19, and a current E, corresponding to the phase difference of the two signals, is output from phase detector 19. Current E and an offset current L (with a constant magnitude) from a direct current source 20 are combined by current-joining means 21 and input into an integrator 7. The current is integrated in integrator 7 and fed back to the input of voltage-controlled oscillator 8, completing the feed-back loop.

Due to the negative feed-back of the loop, the oscillation frequency and phase of voltage-controlled oscillator 8 finally settle and become constant; and input signal A and synchronization signal B are phase-locked with a certain phase difference. Since the control voltage of voltage-controlled oscillator 8, i.e., the output voltage of integrator 7, is held constant by feed-back in the state in which the phases are locked, the input of integrator 7 is held at zero. That is, the phases are locked in a state in which the output current of phase detector 19 and the offset current L cancel each other.

When offset current L from direct current source 20 is changed to a new value, the feed-back of the loop acts in the direction to make the input of integrator 7 zero; hence, the output of phase detector 19 changes in such a way that the new value of offset current L is canceled out, and the loop locks to the new phase. Therefore, by controlling the magnitude of direct current L, it is possible to change the phase difference of input signal A and synchronization signal B to any arbitrary value. The conventional phase locked loop controls the phase of the synchronization signal to any arbitrary value by this kind of method.

This method presupposes that input signal A is a repetitive waveform, i.e., the edge of the input signal A comes in a regular manner. In cases of input signals with edges which occur intermittently, like digital signals, this method does not operate well. The reasons for this will be discussed below, by means of examples shown in FIGS. 9 and 10. Furthermore, in the diagrams in which a digital input signal A, discussed below, is shown, the waveform is not drawn in a distorted manner, as in FIG. 6, for purposes of simplification.

Figure 9:
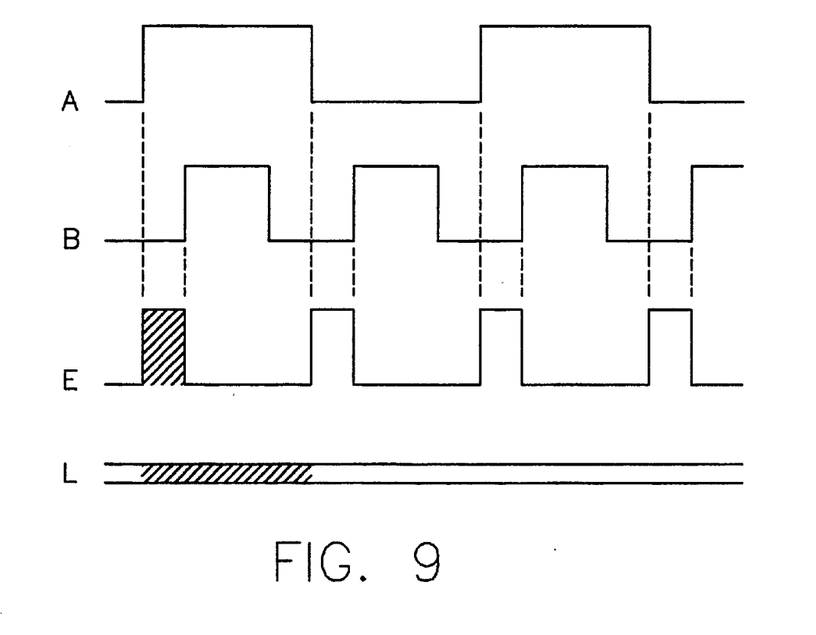
(FIG. 9): Diagram showing examples of signals of the internal operation in the make-up of FIG. 8.
Figure 10:
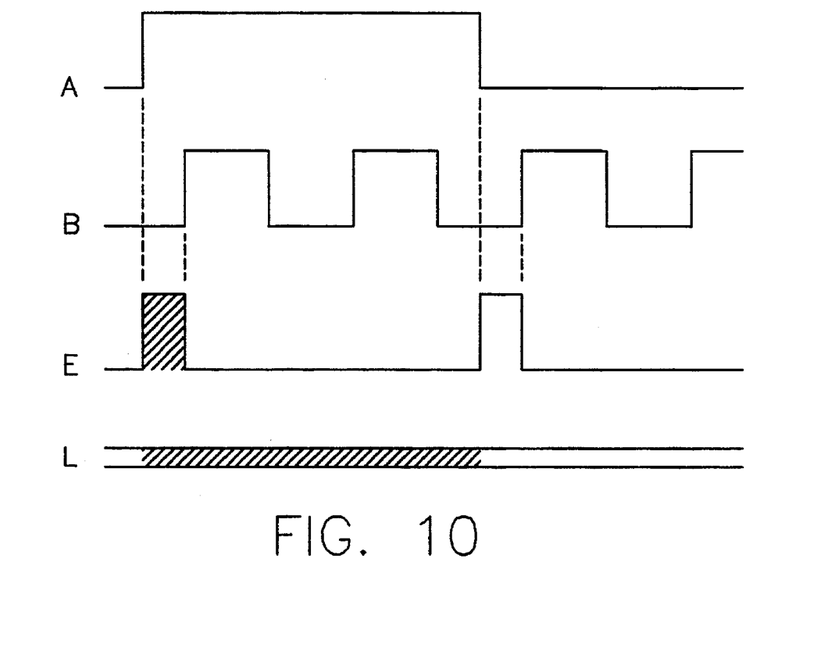
(FIG. 10): Diagram showing examples of signals of the internal operation in the make-up of FIG. 8.

Output signal E of phase detector 19, in FIGS. 9 and 10, consists of pulses with widths which extend from the rising or falling edge of digital input signal A to the rising edge of synchronization signal B. The feedback acts in such a way that a phase difference arises by which the mean value of signal E and the offset current L cancel each other. That is, the phase difference becomes such that the areas shown by the diagonal hatching in the figure become equal.

FIG. 9 is an example in which the rising or falling edges of digital signal A alternatively come once each period of the synchronization signal. In FIG. 10, on the other hand, an example is shown in which the rising or falling edges of the digital signal alternatively come once in two periods of the synchronization signal. Comparing the outputs E of phase detector 19, the widths of the pulses in FIGS. 9 and 10 are the same, but the numbers of pulses are in the ratio of 1 to 2. Therefore, the mean current of E in FIG. 10 is ½ that of FIG. 9. In order to control the phase difference so that it is the same as in FIG. 9, the direct current offset current L of FIG. 10 must be made ½. In FIG. 10, the current L is drawn as ½. Conversely, if the magnitude of the offset current L is not changed, the feedback acts in a direction such that the pulse width of E broadens so that a phase difference is caused which cancels this, and the phase difference doubles between the digital signal and the synchronization signal.

Thus, the output E of phase detector 19 appears only when an edge of the input signal occurs, so that, in the case of an input signal the edges of which come intermittently, output E of phase detector 19 varies with the frequency of the edges, even though the phase difference does not vary. Therefore, in a case in which the offset current is constant, the phase difference varies in the opposite manner.

In the case of a digital signal input, the frequency with which the edges of input signal A occur is completely random; therefore, even if the magnitude of offset current L is constant, the phase of synchronization signal B varies randomly and cannot be kept a constant value.

In the case of an input signal, the edges of which come intermittently, such as a digital signal, the phase locked loop is settled in a stable manner and a synchronization signal with a constant phase is obtained only when the offset current L is zero. That occurs when the edges of input signal A and the edges of synchronization signal B coincide with each other. The output E of the phase detector 19 is also always zero.

Thus, in the means of FIG. 8, the phase of the synchronization signal cannot be changed to an arbitrary value with respect to input signals, the edges of which come intermittently, such as digital signals.

Figure 11:
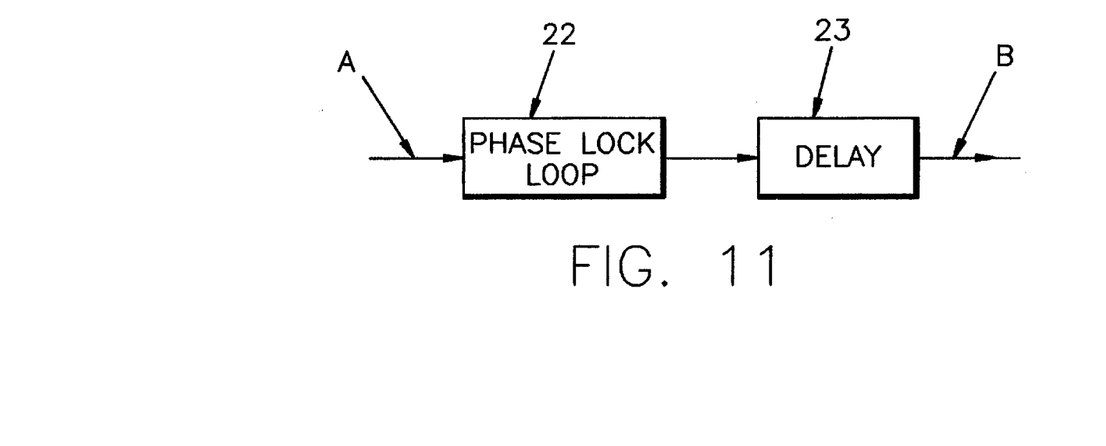
(FIG. 11): Diagram showing an example of a synchronization signal extraction device with a phase difference due to a delay circuit of the conventional technology.

Therefore, as a means for generating a synchronization signal which has a phase difference with respect to an input signal, the edges of which come intermittently, a method which uses a phase locked loop and a delay circuit, as shown in FIG. 11, has been proposed. Phase locked loop 22 of FIG. 11 is a phase locked loop of the kind shown in FIG. 8 above; it holds at zero the phase difference between the input signal and the synchronization signal. If its output is output through the delay circuit 23 as synchronization signal B, synchronization signal B is delayed by a quantity which is determined by the characteristic of delay circuit 23 with respect to the output of phase locked loop 22. Therefore, a synchronization signal B can be obtained which has a constant, arbitrarily chosen phase difference from input signal A. However, this phase difference is a constant, corresponding to the characteristic of delay circuit 23; it is not possible to make it variable. Conversely, in order to make the phase variable, a delay circuit with a variable delay time is needed, which is hard to realize in practice.

Figure 12:
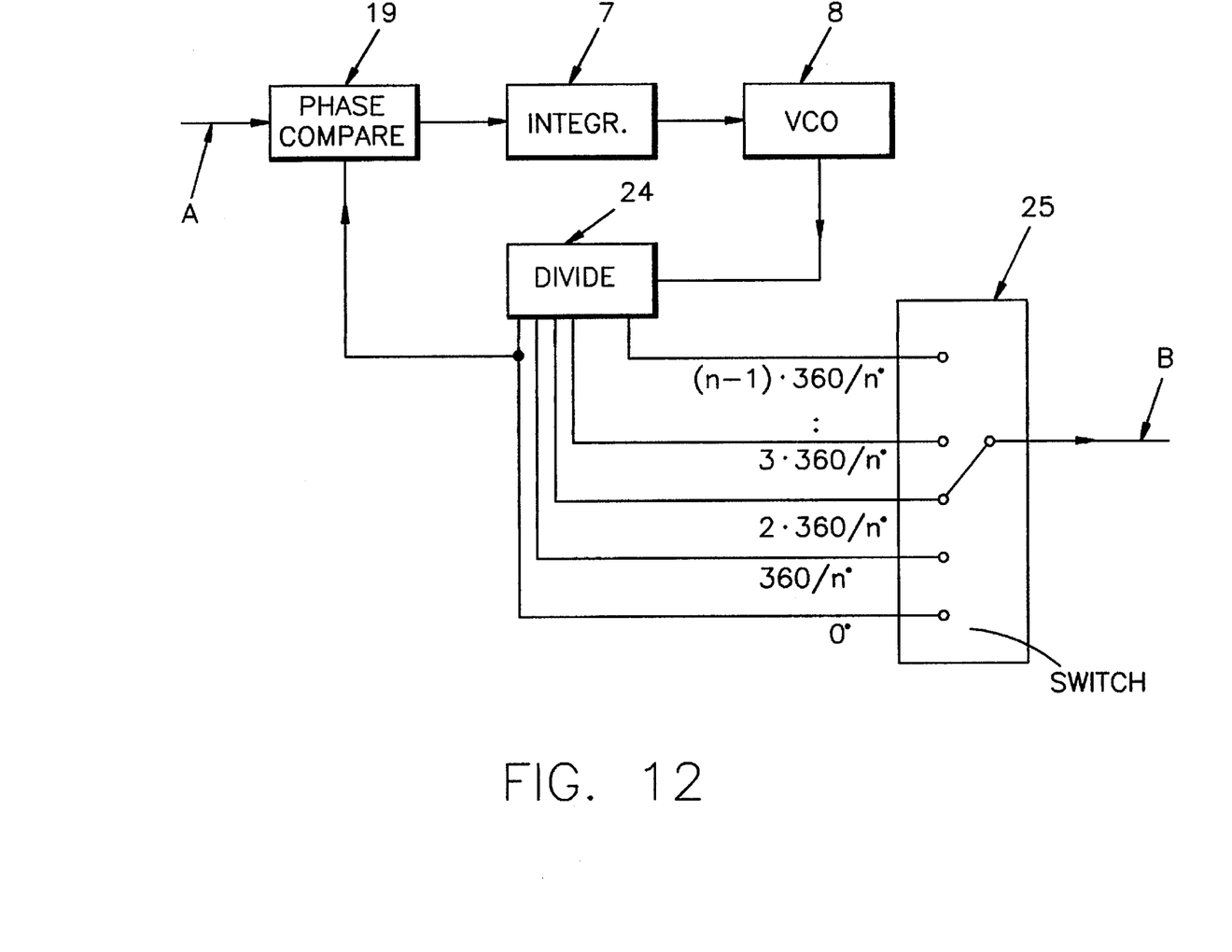
(FIG. 12): Diagram showing an example of a synchronization signal extraction device with a phase varying function due to a divider of the conventional technology.

As a means for outputting a synchronization signal with a variable phase with respect to input signals with intermittent edges, such as digital data, there is a method which uses a phase locked loop with a frequency divider, as shown in FIG. 12.

In FIG. 12, divider 24 divides the output of voltage-controlled oscillator 8 into n parts, and n signals are output, each of which has a phase which differs by 360/n degrees from the previous one. If one specific signal among these n signals is returned to phase detector 19, the signal is phase-locked, with a phase difference of zero with respect to input signal A. Therefore, in the phase-locked state, the frequency of the signal is maintained so that it is equal to that of input signal A, and the phase difference becomes zero; hence, the output of the voltage-controlled oscillator 8 is a frequency n times that of input signal A, and it becomes a signal which is synchronized with the input signal. The output of divider 24, which divides by n, is equal to the frequency of the input signal A, and becomes n signals, such that their phase differences are integral multiples of 360/n degrees.

By selecting a suitable signal from these n signals by means of selection switch 25, a signal can be obtained which is synchronized with the input signal A and the phase of which is an integral multiple of 360/n degrees, and is output as the synchronization signal. For example, if n is 8, synchronization signals with phases which can be varied by intervals of 360/8=45 degrees can be generated.

Since the steps by which the phase is varied are limited to 360/n degrees, it is necessary to make the division ratio n of the divider large when one wishes to vary the phase very precisely. If the division ratio n becomes large, divider 24 and selection switch 25 become complex. Moreover, if the division ratio n is made large, the frequencies handled by voltage-controlled oscillator 8 and divider 24 also become high, which leads to technical difficulties. Moreover, even if the division ratio n can be made large, the phase of the synchronization signal can only be varied in steps, and not continuously.

The prior art thus made it possible to vary the phase of a synchronization signal to arbitrary values, in cases in which the input signals were repeated waveforms. But the phase of a synchronization signal with respect to an input signal, in cases of signals with edges which come intermittently, such as digital signals, was either constant at a specific value, or even if it was variable, it could only be varied in certain steps, and could not be varied continuously to any arbitrary phase.

This invention has the purpose of solving the aforementioned problems by providing a synchronization signal generating device which has a means by which the phase difference of the synchronization signal can be varied arbitrarily and continuously, even with respect to input signals with intermittent edges.

SUMMARY OF THE INVENTION

Figure 1:
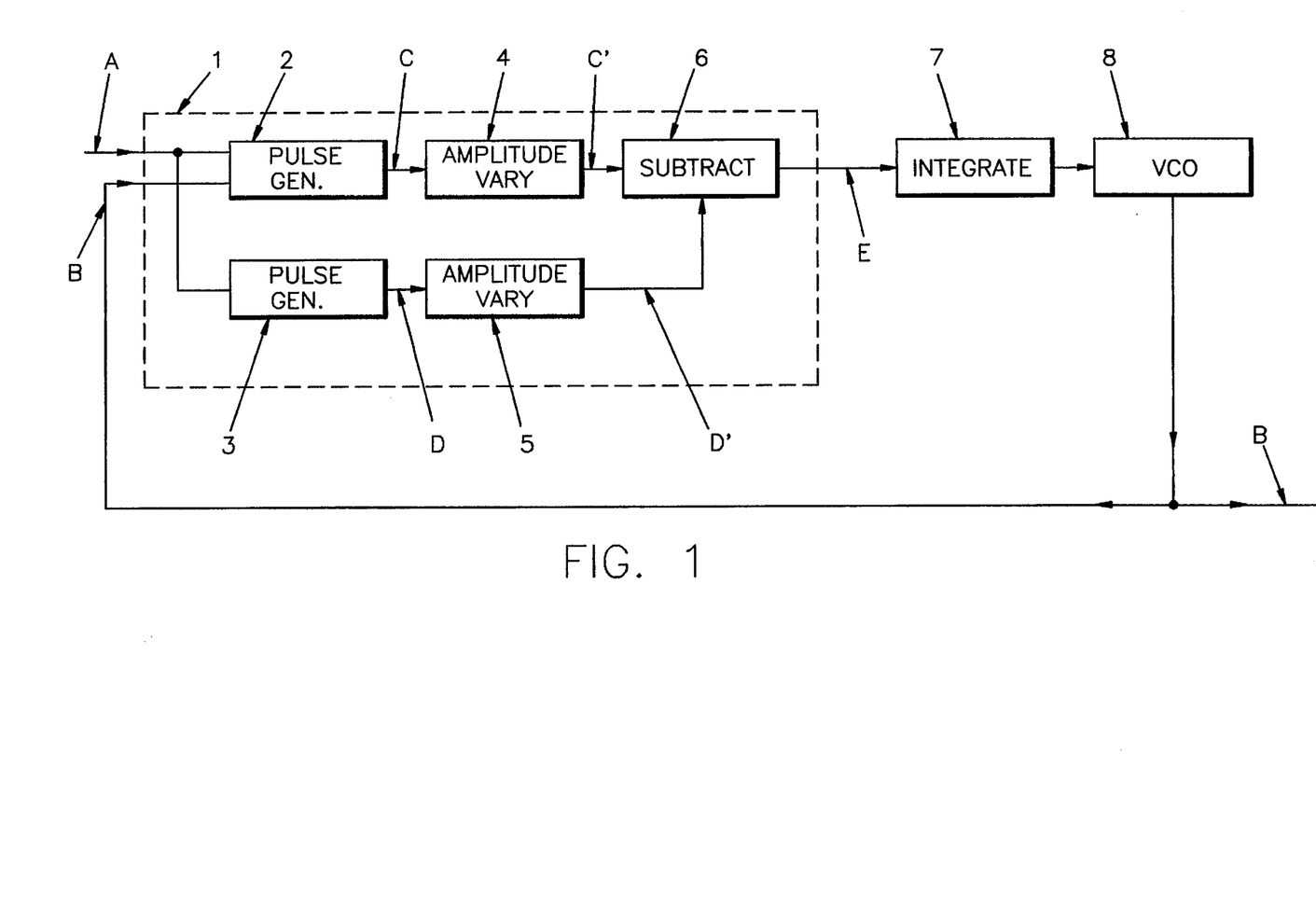

This invention, as shown in the block diagram of FIG. 1, is one in which the phase detector of a second order phase locked loop of a negative feed-back type comprises a phase detector 1, which consists of a means 2 which generates pulses with widths corresponding to phase differences between an input signal and a synchronization signal only when the edges of the input signal arrive; a means 3 which generates pulses of constant width only when the edges of the input signal or the synchronization signal arrive; means 4 and 5 which vary the amplitudes of one or both of these pulses; and a means 6 which subtracts or adds the pulses.

BRIEF DESCRIPTION OF THE DRAWINGS (FIG. 1): Diagram showing the fundamental make-up of an example of this invention.

EXPLANATION OF SYMBOLS

1: Phase detector of this invention;
2: Means for generating pulses with widths corresponding to the phase difference;
3: Means for generating pulses with constant width;
4: Means for changing the amplitude of the pulse;
5: Means for changing the amplitude of the pulse;
6: Means for subtracting 2 pulses;
7: Integrator;
8: Voltage-controlled oscillator;
9: Flip-flop;
10: Flip-flop;
11: AND gate;
12: Variable-gain amplifier;
13: Variable-gain amplifier;
14: Subtracter amplifier circuit;
15: Low-pass filter;
16: Low-pass filter;
17: Low-frequency amplifier;
18: Low-frequency amplifier;
19: Phase detector;
20: Direct-current offset current source;
21: Current junction means;
22: Phase locked loop;
23: Delay circuit;
24: Divider;
25: Selection switch;
A: Input signal to phase locked loop (read-out digital signal);
B: Synchronization signal;
C: Pulse of width corresponding to the phase difference of A and B;
C': Pulse which varies the amplitude of pulse C;
D: Pulse with constant width;
D': Pulse which varies the amplitude of pulse D;
E: Output of phase detector;
F: Original digital signal;
G: Sampled signal;
H: Reproduced digital signal;
J: Threshold;
K: Sample causing error;
L: Direct-current offset current.

DETAILED DESCRIPTION OF THE INVENTION

Figure 2:
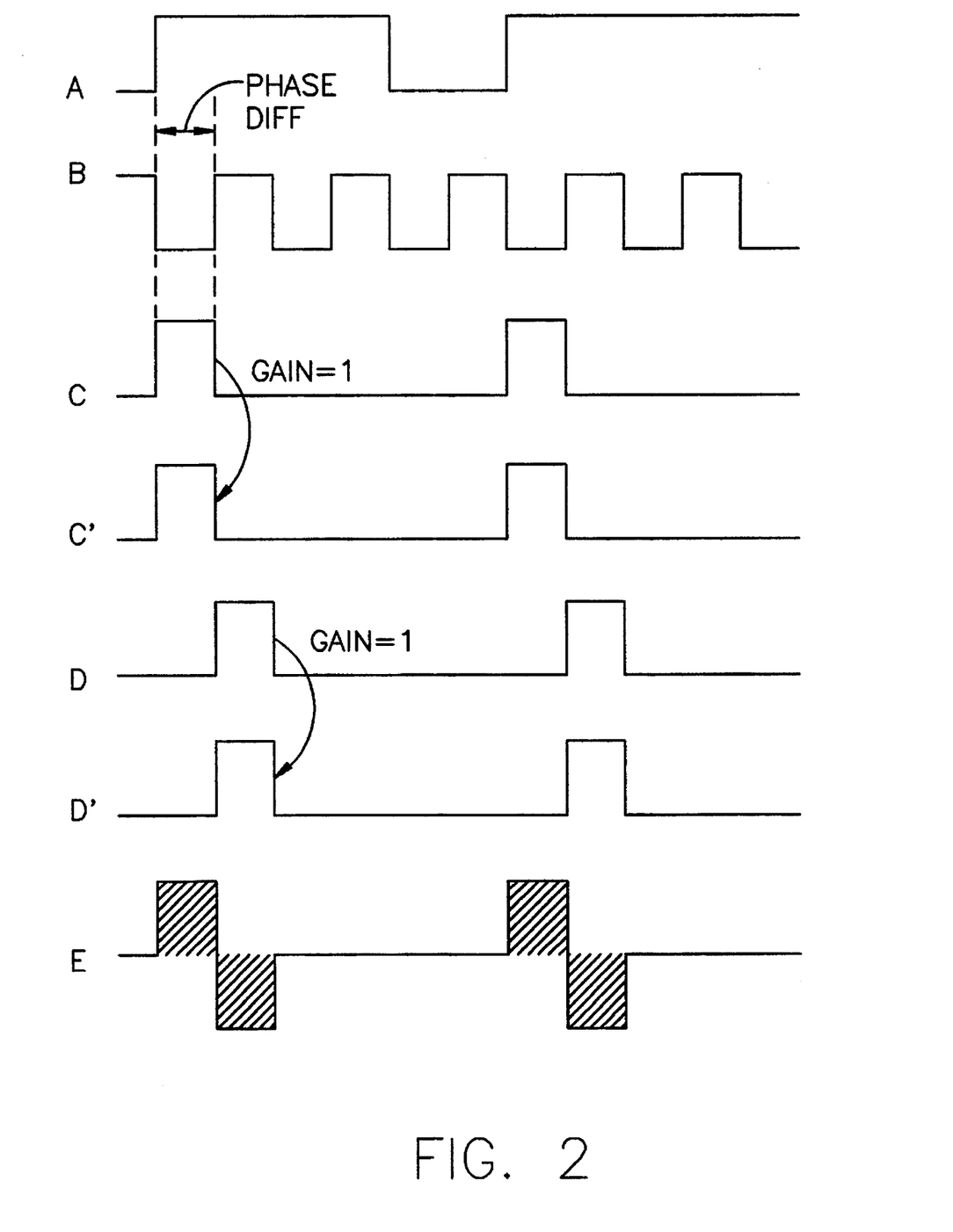
(FIG. 2): Diagram showing examples of signals of the internal operation of the example of this invention.

A block diagram of a circuit embodying the invention is shown in FIG. 1, and a timing diagram which explains the operation of FIG. 1 is shown in FIG. 2. In FIG. 1, a phase detector 1 is made up of pulse generating means 2 and 3, amplitude varying means 4 and 5, and a means 6 for subtracting two pulses. A phase locked loop is made up of phase detector 1, an integrator 7, and a voltage-controlled oscillator 8. Furthermore, the same reference numbers are given to the structural elements with the same functions as in the conventional technology.

Pulse generating means 2 outputs a pulse C, only upon the rising edge of input signal A, pulse C having a width which corresponds to the phase difference between input signal A and a synchronization signal B. Pulse generating means 3 outputs a pulse D with a constant width only upon the rising edge of input signal A or synchronization signal B. In FIG. 2, in order to make the operation easier to understand, pulse D rises at the rising edge of synchronization signal B which comes after the rising edge of input signal A. However, the temporal position of pulse D may be any arbitrary one, as long as it is within one period of the synchronization signal.

The amplitudes of the pulses produced in pulse generating means 2 and 3 pass through the means 4 and 5 which change them, respectively, and pulses C' and D' are obtained (in the figure, the case of a gain of one is shown as an example). Pulses C' and D' are input into means 6 for subtracting two pulses and the difference E of pulses C' and D' is output from phase detector 1. Since negative feed-back is used to drive to zero the input of integrator 7, the phase locked loop locks in a state in which the pulse areas of pulses C' and D' are equal (the diagonal hatching of E in FIG. 2).

Now, if we assume that the amplitudes of pulses C and D are equal, and the changes of amplitude with respect to pulses C and D by means for changing amplitudes 4 and 5 are zero, the amplitudes of pulses C' and D' become equal. In this case, as shown in FIG. 2, the pulse width of pulse D', which has a constant width, yields the phase difference between the input signal and the synchronization signal.

Figure 3:
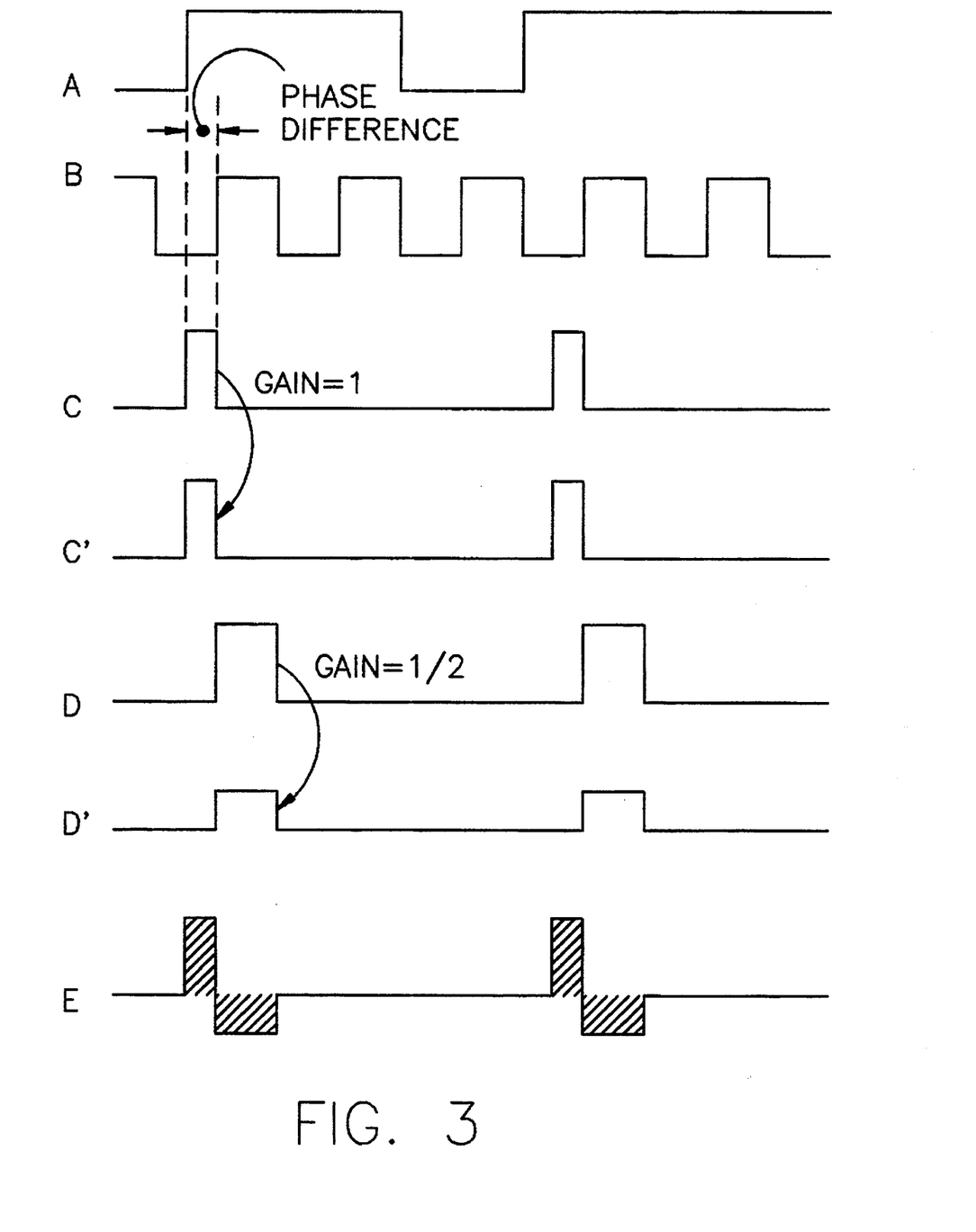
(FIG. 3): Diagram showing examples of signals of the internal operation of the example of this invention.

In the aforementioned phase-locked state, if the amplitude of the pulse D' is varied, as shown in FIG. 3, the pulse area of D' changes, and the equality between the areas of the pulses C' and D' is destroyed. Since the feedback of the phase locked loop acts in such a way as to cancel out this change, that is, to change the pulse area of C' so that they are equal, the phase difference between the input signal A and the synchronization signal B changes until the pulse areas of C' and D' become equal. By varying the amplitude of pulse D' continuously in this manner, the phase difference between the input digital signal A and the synchronization signal B can be changed to any arbitrary value.

In this manner, a synchronization signal B which has a constant phase, determined by the area of the pulse D' in the phase locked state, with respect to a digital signal input A with an intermittent edge can be obtained.

Furthermore, it is possible to vary at will the phase, not only by changing the amplitude of pulse of D', but also the amplitude of pulse C' or the amplitudes of both pulses C' and D'.

Moreover, it is clear that, as a modification of this example, the same purpose can also be accomplished by a means which changes the width of pulse D.

Furthermore, in the aforementioned explanation, an example is shown in which the operation occurs only upon the rising edge of the input signal, but it is also possible to make it occur with the falling edge, rather than the rising edge, or with both the rising and falling edges. Neither of these modes of operation conflict with the operation of this invention.

In the example described above, pulses C' and D' have the same polarity; their difference is obtained by means 6 for subtracting the pulses C' and D', and this difference is taken as the output E of the phase detector. The same operation can also be obtained by adding pulses C' and D', with either one given reverse polarity, and taking this sum as the output of the phase detector.

Figure 4:
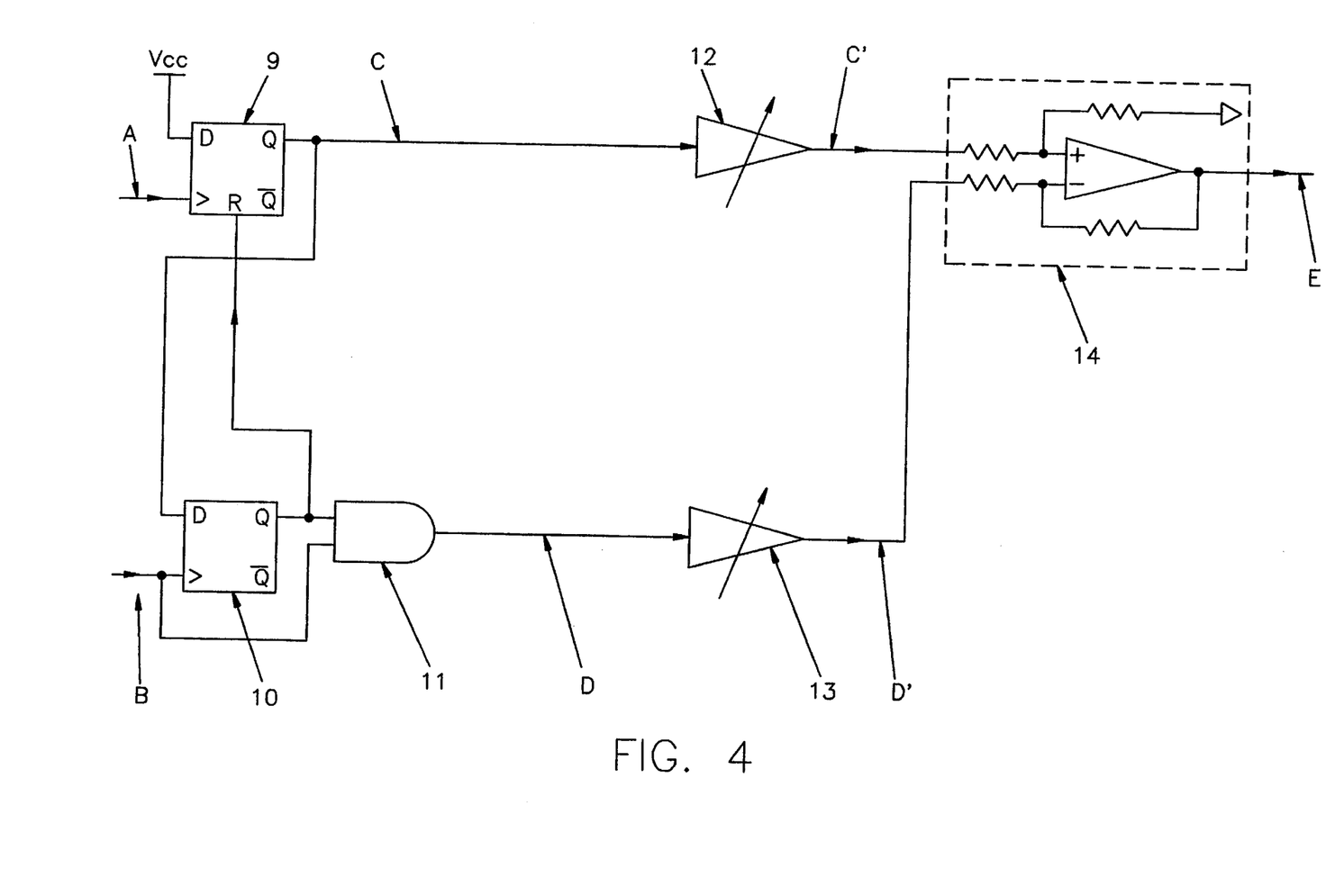
(FIG. 4): Diagram showing a first example of the fundamental constituent elements of the example of this invention.
Figure 5:
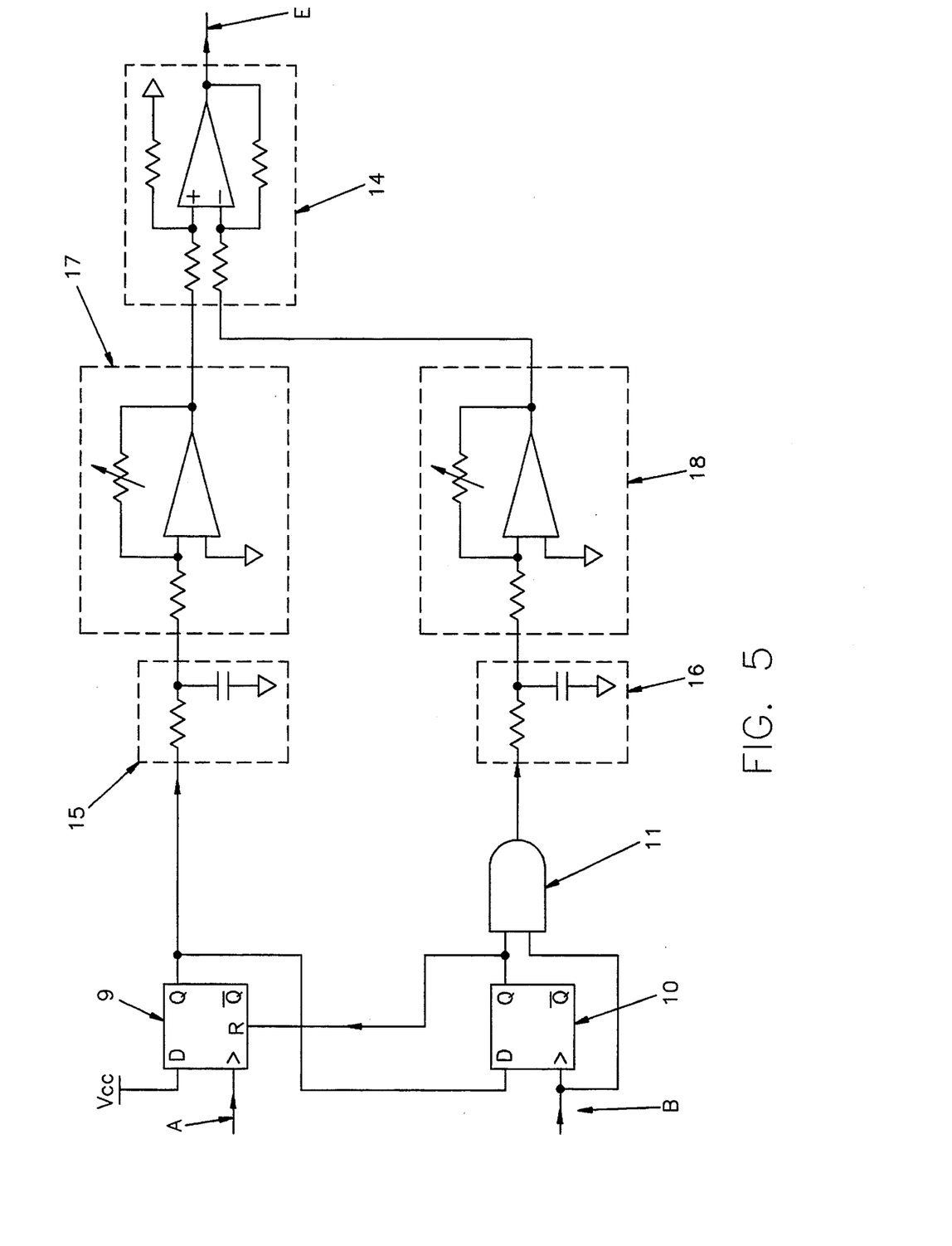
(FIG. 5): Diagram showing a second example of the fundamental constituent elements of the example of this invention.

Additional examples of the constituent elements of the phase detector of this invention are shown in FIGS. 4 and 5. In the example of FIG. 4, means 2 and 3 for generating pulses in FIG. 1 are realized by circuits which combine two flip-flops 9 and 10 and one AND gate. The output terminal Q of flip-flop 9 is held at a low level until occurrence of the rising edge of the input signal A, at which point it changes to a high level. When the rising edge occurs of synchronization signal B, following the rising edge of input signal A, the output terminal Q of flip-flop 10 changes to a high level, flip-flop 9 is reset, and output terminal Q changes to the low level. By this means, a pulse is output with a width corresponding to the time difference between the rising edge of input signal A and the rising edge of synchronization signal B, i.e., the phase difference between A and B. The pulse output occurs only at the time of the rising edge of input signal A. That is, output terminal Q of flip-flop 9 outputs the signal C shown in FIG. 2.

On the other hand, output terminal Q of flip-flop 10 changes to the high level after the rising edge of synchronization signal B and is in the high level during one period of synchronization signal B. As a result, a high level for one period of the synchronization signal B is applied to the input of AND gate 11 only after occurrence of the leading edges of the synchronization signal B and input signal A. Thus, a pulse with a width equal to the high level period of the synchronization signal B is output from the AND gate only after the rising edge of synchronization signal B. That is, the output of the AND gate is signal D shown in FIG. 2.

Pulses C and D are passed through respective variable gain amplifiers 12 and 13 and are applied to wide-band subtraction amplifier circuit 14. That is, the difference between pulses C' and D' is extracted by wide-band subtraction amplifier circuit 14 and is taken as the output of the phase detector (E of FIG. 2). As a result, since the mean value of the output of the phase detector is zero in the phase-locked state, the areas of the pulses C' and D' become equal. If we assume that the amplitudes of pulses C and D are equal, and the gains of the variable gain amplifiers 12 and 13 are equal, the phase difference between input signal A and synchronization signal B, which is the width of pulse C, is equal to the high time of the synchronization signal, which is the width of pulse D. If the duty ratio of the synchronization signal is 1:1, a synchronization signal B with a phase of 180 degrees with respect to digital input signal A is obtained.

Moreover, if either or both of the amplitudes of pulses C and D are changed at will by wide-band variable gain amplifiers 12 or 13, it is possible to change the phase of synchronization signal B at will, as shown in FIG. 3.

As discussed above, the phase difference between input signal A and synchronization signal B can be changed by changing the amplitudes of pulses C and D. However, it is not easy, in general, to change the amplitudes to any arbitrary value, since the pulses contain high-frequency components. Since the information needed for the output of the phase detector is the direct-current component of the pulse, there is no problem with removing the high-frequency component of the pulse. Therefore, in the example of FIG. 5, low-pass filters 15 and 16 are attached to the output terminals of flip-flop 9 and AND gate 11, respectively. The high-frequency component is dropped, and the low-frequency-component only is used as the signal; the gain with respect to this low-band signal is changed by low-frequency amplifiers 17 and 18, and the subtraction is performed by the subtraction amplifier circuit 14. Therefore, since the constituent elements need only act on the low-frequency component, the adjustment of the phase can be performed by simpler circuits. The low-pass filters and low-frequency amplifiers may also be combined in other arrangements than that shown in this example.

Examples of this invention have been shown, but they do not limit the form, arrangement, and other aspects of the invention; changes in the make-up of the invention are permitted, if desired, as long as the gist of the invention is preserved.

EFFECTIVENESS OF INVENTION

According to this invention, a synchronization signal generating circuit which generates a synchronization signal of any arbitrary phase difference with respect to a signal with intermittent edges, such as digital data, can be realized by a simple circuit structure. By doing so, the measurement of the bit error rate with respect to variations in the phase difference of the synchronization signal, which is an important evaluation item for digital recording devices, is made easier. Moreover, it is possible to optimize the phase of the synchronization signal during read-out in digital recording devices, so that bit errors are minimized.

We claim:

1. A phase detector, comprising:

first means for providing a first input signal;

second means for providing a second input signal;

first pulse generating means connected to said first means and second means, for generating a first pulse having a width corresponding to a phase difference between said first input signal and said second input signal, upon occurrence of an edge of said first input signal;

second pulse generating means coupled to said first means or said second means for generating a second pulse having a substantially constant time duration, upon occurrence of an edge of said first input signal or said second input signal;

variation means coupled to said first pulse generating means and second pulse generating means for varying an amplitude or direct current component of one or both of said first pulse and said second pulse and providing a pair of output signals corresponding to said first pulse and second pulse after said varying; and means for combining said pair of output signals of said variation means to derive a phase comparison signal.

2. A phase detector in accordance with claim 1, further comprising:

low-pass filter means coupled between at least one of said first pulse generating means or said second pulse generating means and said variation means.

3. A phase detector in accordance with claim 1, wherein said first pulse generating means and said second pulse generating means comprise:

first flip-flop means for generating a first output signal when said first input signal is received and having a reset input;

second flip-flop means for receiving said second input signal and said first output signal and for generating a second output signal to said reset input of said first flip-flop means;

AND gate means for receiving said second input signal and said second output signal, and, in response to an AND occurrence thereof, generating a third output signal; and means for coupling said first and third output signals to said variation means.

4. A synchronization signal generating device, including a voltage-controlled oscillator (VCO) and a phase comparing means which applies a phase comparison signal to said VCO corresponding to a phase difference between an output signal of said VCO and a reference input signal, said phase comparing means comprising:

first pulse generating means connected to said reference input signal and said output signal of said VCO, for generating a first pulse having a width corresponding to a phase difference between said reference input signal and said output signal of said VCO, upon occurrence of an edge of said reference input signal;

second pulse generating means for generating a second pulse having a substantially constant time duration, upon occurrence of an edge of said output signal of said VCO;

variation means coupled to said first pulse generating means and second pulse generating means for varying an amplitude or direct current component of one or both of said first pulse and said second pulse and providing a pair of output signals corresponding to said first pulse and second pulse after said varying; and means for combining said pair of output signals of said variation means to derive said phase comparison signal.

5. A synchronization signal generating device, in accordance with claim 4, further comprising:

low-pass filter means coupled between at least one of said first pulse generating means or said second pulse generating means and said variation means.

6. A synchronization signal generating device, in accordance with claim 4, wherein said first pulse generating means and said second pulse generating means comprise:

first flip-flop means for generating a first output signal when said reference input signal is received and having a reset input;

second flip-flop means for receiving said output signal of said VCO and said first output signal and for generating a second output signal to said reset input of said first flip-flop means;

AND gate means for receiving said output signal of said VCO and said second output signal, and, in response to an AND occurrence thereof, generating a third output signal; and means for coupling said first and third output signals to said variation means.

* * * * *